(12) United States Patent
Olson et al.

(10) Patent No.: US 7,565,395 B2
(45) Date of Patent: Jul. 21, 2009

(54) MECHANISM FOR PRESERVING SESSION STATE WHEN USING AN ACCESS-LIMITED BUFFER

(75) Inventors: Lance E. Olson, Sammamish, WA (US);
Mauro Ottaviani, Mercer Island, WA (US); Anastasios Kasiolas, San Mateo, CA (US); Michael Steven Vernal, Seattle, WA (US); Michael T. Dice, Redmond, WA (US); Alfred M. Lee, IV, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 819 days.

(21) Appl. No.: 11/049,071

(22) Filed: Feb. 1, 2005

(65) Prior Publication Data

US 2006/0174011 A1 Aug. 3, 2006

(51) Int. Cl.
*G06F 15/16* (2006.01)
*G06F 15/173* (2006.01)
(52) U.S. Cl. .................. 709/201; 709/219; 709/223
(58) Field of Classification Search ............... 709/201, 709/219, 223
See application file for complete search history.

(56) References Cited

U.S. PATENT DOCUMENTS

| 5,701,484 | A * | 12/1997 | Artsy ..................... 719/316 |
| 5,881,239 | A * | 3/1999 | Desgrousilliers ............ 709/226 |
| 6,393,481 | B1 * | 5/2002 | Deo et al. .................. 709/224 |
| 6,763,520 | B1 * | 7/2004 | Seeds ..................... 718/101 |
| 6,854,114 | B1 * | 2/2005 | Sexton et al. ............... 718/1 |
| 2002/0059587 | A1 * | 5/2002 | Cofano et al. .............. 725/35 |
| 2002/0065915 | A1 * | 5/2002 | Anderson et al. ........... 709/225 |
| 2002/0120729 | A1 * | 8/2002 | Faccin et al. .............. 709/223 |
| 2003/0031183 | A1 * | 2/2003 | Kashyap et al. ........... 370/395.2 |
| 2003/0032391 | A1 * | 2/2003 | Schweinhart et al. ....... 455/12.1 |
| 2003/0093499 | A1 * | 5/2003 | Messinger et al. ........... 709/219 |
| 2003/0182261 | A1 * | 9/2003 | Patterson .................. 707/1 |
| 2003/0182400 | A1 * | 9/2003 | Karagounis et al. ......... 709/219 |

(Continued)

FOREIGN PATENT DOCUMENTS

EP 1233631 A2 2/2002

(Continued)

OTHER PUBLICATIONS

Shepard, Greg. New Features Improve Your Web Server's Performance, Reliability, and Scalability. Mar. 2002. MSDN Magazine. pp. 1-12.*

*Primary Examiner*—Salad Abdullahi
*Assistant Examiner*—Imad Hussain
(74) *Attorney, Agent, or Firm*—Workman Nydegger

(57) ABSTRACT

Preserving session state correlation in a distributed computing environment in which a service module instance receives messages from a general input buffer. The general input buffer is not accessed by a service module instance once the service module instance is determined to be recycled. After the service module instance receives a session initiation message through the general input buffer, a session-oriented input buffer is associated with the service module instance. Any subsequent session messages are then received by the service module via the session-oriented input buffer. Even if the service module instance was determined to be recycled mid-session, the service module instance would still operate to process all of the remaining session messages from the session input buffer, thereby preserving session continuity.

16 Claims, 3 Drawing Sheets

U.S. PATENT DOCUMENTS

| | | | |
|---|---|---|---|
| 2003/0182464 A1* | 9/2003 | Hamilton et al. | 709/314 |
| 2003/0204551 A1* | 10/2003 | Chen | 709/102 |
| 2003/0212818 A1* | 11/2003 | Klein et al. | 709/238 |
| 2004/0030770 A1* | 2/2004 | Pandya | 709/223 |
| 2004/0034718 A1* | 2/2004 | Goldenberg et al. | 709/250 |
| 2004/0034855 A1* | 2/2004 | Deily et al. | 718/102 |
| 2004/0044760 A1* | 3/2004 | Deily et al. | 709/223 |
| 2004/0098364 A1* | 5/2004 | Liukkonen et al. | 707/1 |
| 2004/0133680 A1* | 7/2004 | Sorrentino et al. | 709/226 |
| 2004/0167961 A1* | 8/2004 | Jain et al. | 709/203 |
| 2004/0186601 A1* | 9/2004 | Swenson et al. | 700/94 |
| 2004/0249958 A1* | 12/2004 | Ozdemir et al. | 709/229 |
| 2005/0015643 A1* | 1/2005 | Davis et al. | 714/4 |
| 2005/0021594 A1* | 1/2005 | Bernardin et al. | 709/200 |
| 2005/0055399 A1* | 3/2005 | Savchuk | 709/203 |
| 2005/0188070 A1* | 8/2005 | Tripathi et al. | 709/223 |
| 2006/0294112 A1* | 12/2006 | Mandato et al. | 707/100 |

FOREIGN PATENT DOCUMENTS

WO     WO 03/032185     10/2002

* cited by examiner

MECHANISM FOR PRESERVING SESSION STATE WHEN USING AN ACCESS-LIMITED BUFFER

BACKGROUND OF THE INVENTION

1. The Field of the Invention

The present invention relates to distributed service activation technology; and more specifically, to mechanisms for providing continuity in session state when service module recycling is requested during the session.

2. Background and Related Art

Computing technology has transformed the way we work and play. Computing systems now take a wide variety of forms including desktop computers, laptop computers, tablet PCs, Personal Digital Assistants (PDAs), household devices and the like. In its most basic form, a computing system includes system memory and one or more processors. Software in the system memory may be executed by the processor to direct the other hardware of the computing system to perform desired functions.

Distributed computing technology permits multiple applications or processes to communicate to accomplish a particular task. Such distributed computing need not be physically distributed. For instance, objects within the same process may communicate, and objects in different processes may communicate on the same local computing system. On the other hand, distributed computing technology may also permit communication between processes running on remote computing systems. Distributed computing technologies enable computing systems to communicate whether locally, or even over vast distances, thereby expanding on computer functionality.

In a distributed computing environment, a service module often responds to messages originating from one or more other requesting modules, whether or not the requesting and service modules are located on the same physical machine, or are remotely located. In order to provide the service, the service module sometimes engages in an entire session with the other computing system. Sessions are characterized by a number of message exchanges in which there is state regarding the session that should be maintained between sessions in order for the session to be successfully completed.

One conventional problem with such session-oriented message exchanges occurs when the service module is recycled. Recycling refers to the de-activation of one instance of the service module. Future request to the service module are handled by another instance of the service module. Such recycling should ideally be transparent from the viewpoint of the request module(s). During a session-oriented message exchange, a service module will typically access incoming messages via an input buffer. Some input buffers are configured such that when an instance of the service module is determined to be recycled, the service module instance may no longer access the input buffer.

If not all of the session messages had yet been provided to the input buffer, all future session messages would be received by another instance of the service module. Session state is often maintained in volatile memory. Accordingly, the second instance of the service module may not have access to the same session state that the first instance of the service module did. Thus, the session is less likely to be successfully competed by the second instance of the service module. Session state may be preserved in a non-volatile memory during recycling. However, access to non-volatile memory is slower than access to volatile memory most typically by orders of magnitude.

Therefore, what would be advantageous is a mechanism for preserving session state for a service module even should a recycle determination for the service module instance that handles the session occur mid-session.

BRIEF SUMMARY OF THE INVENTION

The foregoing problems with the prior state of the art are overcome by the principles of the present invention, which are implemented in a distributed computing environment that includes a computing system configured to access messages directed towards a service module using a general input buffer. The input buffer is not accessed by a service module instance once the service module instance is determined to be recycled. The principles of the present invention relate to mechanisms for preserving correlation between messages of the same session handled by the service module instance even should the service module instance be determined to be recycled mid-session.

Specifically, after the service module instance receives a session initiation message through a first input buffer, a different session-oriented input buffer is then associated with the service module instance. Any subsequent session messages are then received by the service module instance via the session-oriented input buffer. Since the session-oriented input buffer is accessable by the service module instance even should the service module instance be determined to be recycled, the same instance of the service module processes all session messages. That instance may de-activate once the session is complete thereby preserving session continuity.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
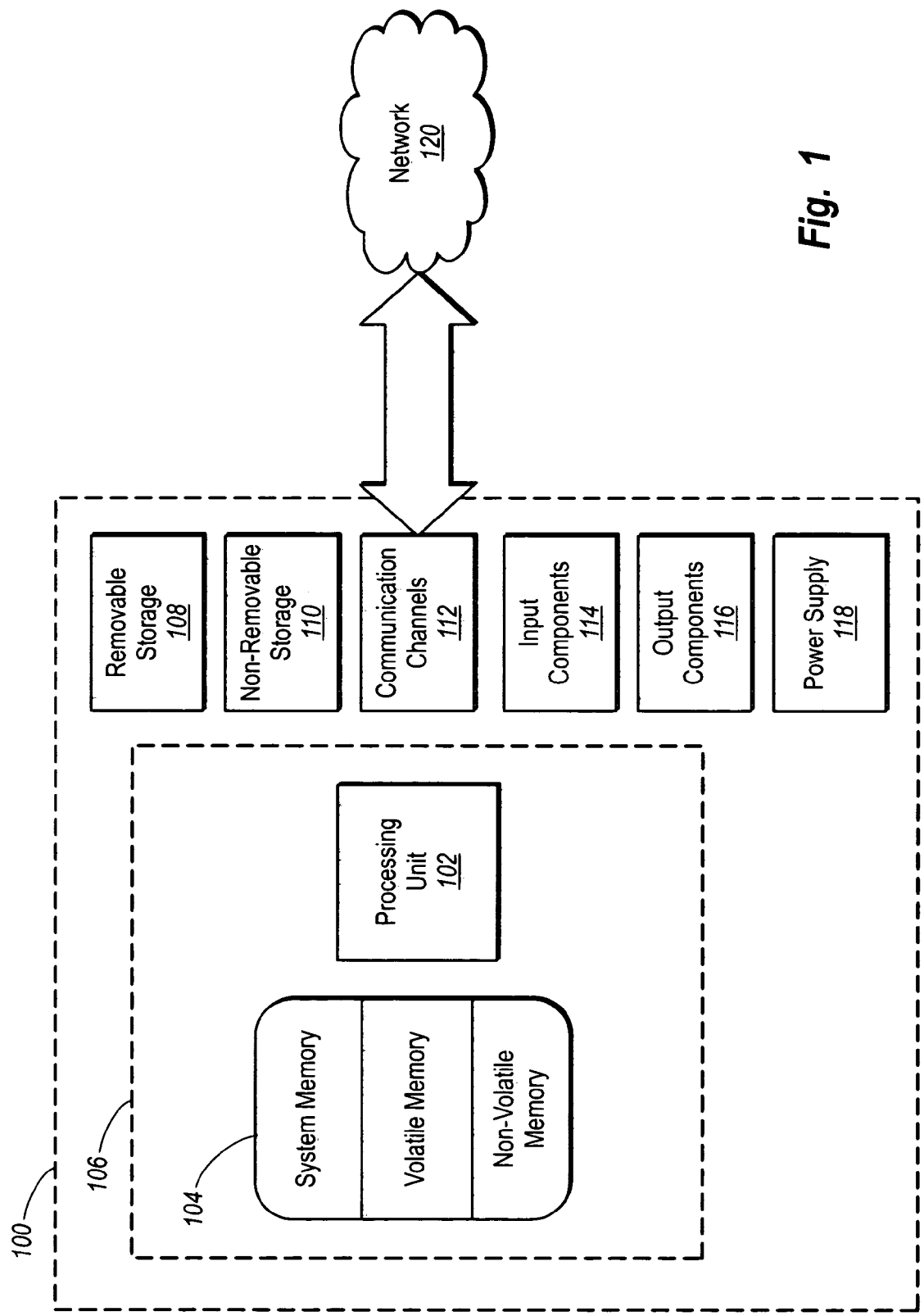
FIG. 1 illustrates a suitable computing system that may implement features of the present invention.

The principles of the present invention may be implemented in a distributed computing environment that includes a computing system configured to access messages directed towards a service module using an input buffer. The input buffer is not accessed by a service module instance one the service module instance is determined to be recycled. The principles of the present invention promote session continuity in the case of a recycling event, despite the input buffer being inaccessible by the service module instance that is handling the session.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

FIG. 1 shows a schematic diagram of an example computer architecture usable for these services. For descriptive purposes, the architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices over, for example, network 120. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
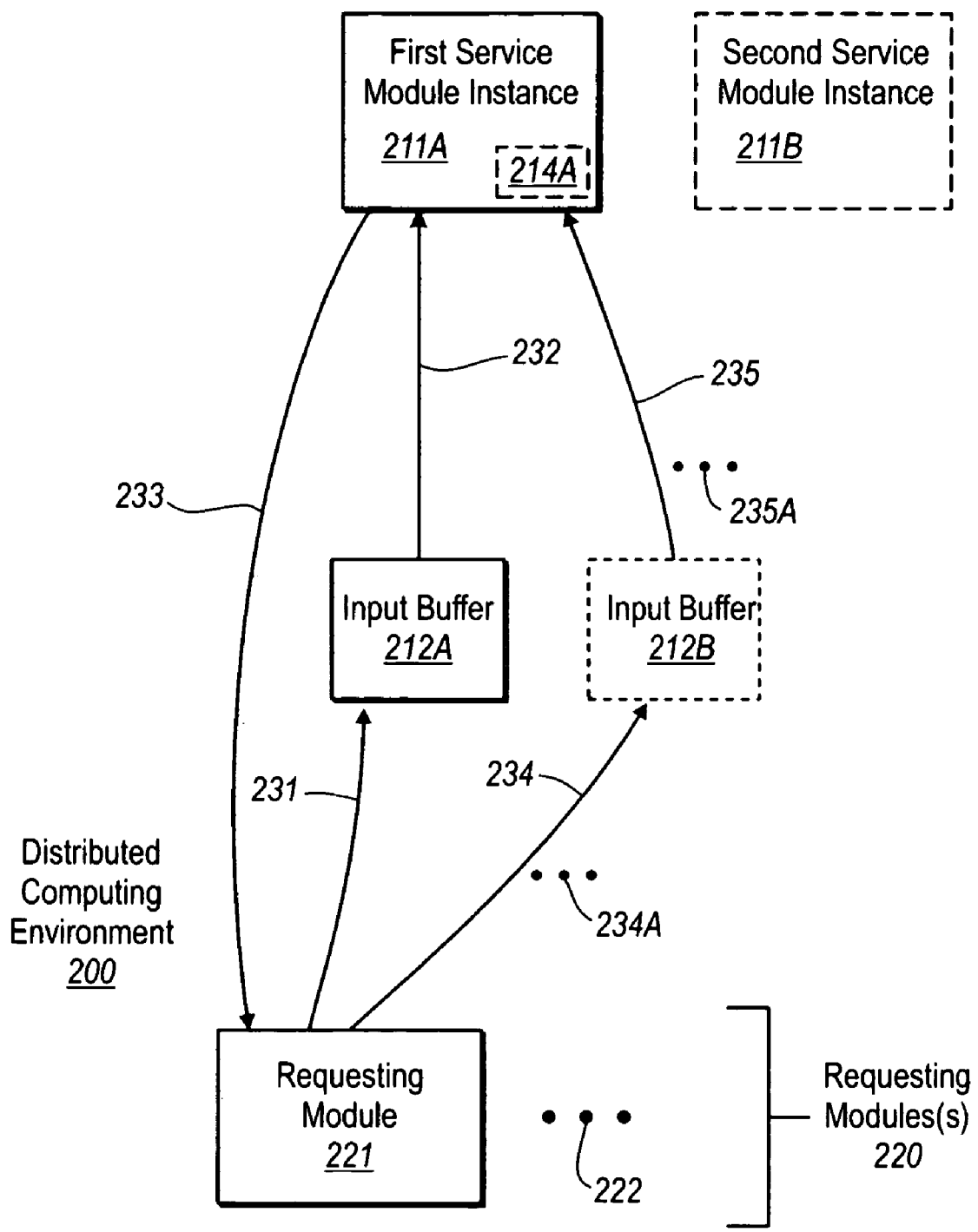
FIG. 2 illustrates a distributed computing environment in which the principles of the present invention may operate.

FIG. 2 illustrates a distributed computing environment 200 in which the principles of the present invention may be employed. The distributed computing environment 200 may be distributed across several objects running in a single process, may be distributed across multiple processes running on the same computing system, or may be distributed across multiple computing systems. Such computing systems may take the form described for computing system 100 of FIG. 1, although they may take any form.

The distributed computing environment 200 includes a service module configured to access messages generated by one or more requesting modules 220 including requesting module 221 amongst potentially any requesting module as represented by the horizontal ellipses 222. During a particular session of message exchanges, the service module may receive a number of incoming messages. Illustrated in FIG. 2 are two instances of the same service module 211 in the form of first service module instance 211A, and second service module instance 211B. The service module may be a process, an application, or an object within the process or application.

Initially, all incoming messages that are destined for the service module 211, and that are not associated with an established session, are received by input buffer 212A. For example, incoming message 231 destined for the service module 211 may be received by the input buffer 212A, whereupon it is provided to the first service module instance 211A as represented by arrow 232.

Figure 3:
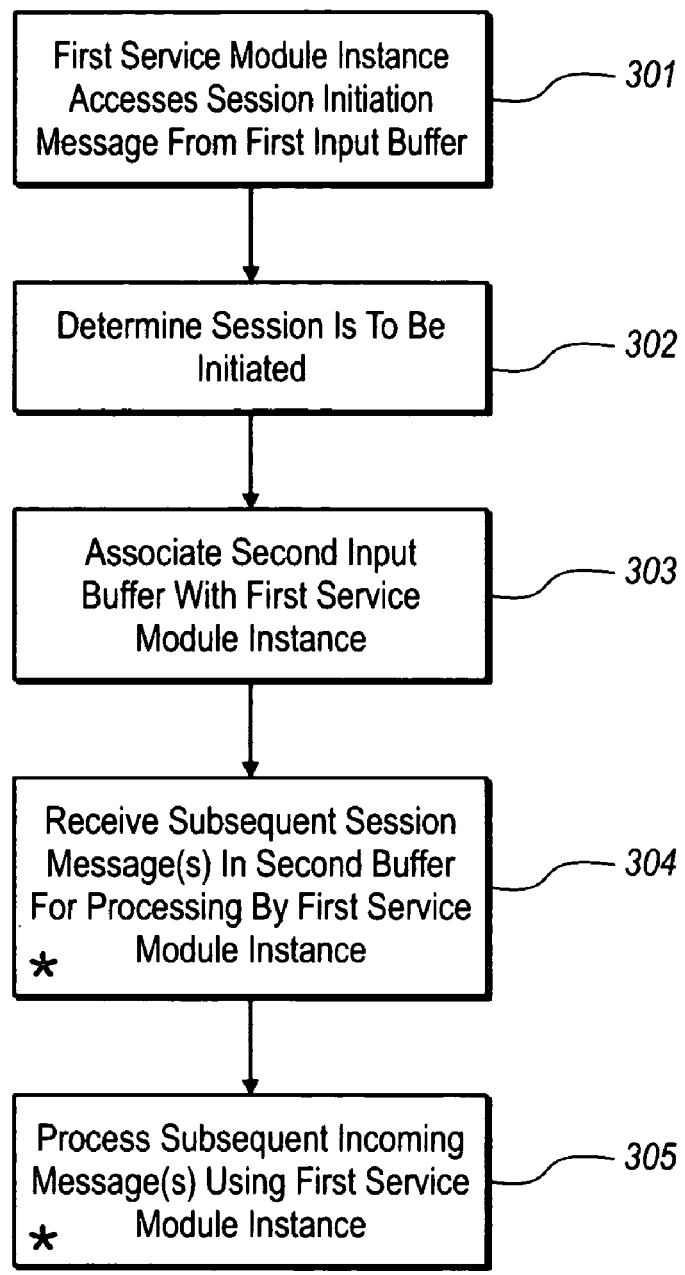
FIG. 3 illustrates a flowchart of a method for preserving session continuity using a session-oriented input buffer in accordance with the principles of the present invention.

FIG. 3 illustrates a flowchart of a method 300 for preserving correlation between messages of the same session in such a context in which the input buffer is input-limited. As the method 300 of FIG. 3 may be performed in the distributed computing environment 200 of FIG. 2, the description of FIGS. 2 and 3 will be highly intermingled.

First in the method 300, the first service module instance accesses a session initiation message (i.e., a request for a session to be established) from the first input buffer. Specifically, referring to FIG. 2, once the first input buffer 212A receives the session initiation message 231, the session initiation message is provided to the first service module instance 211A as represented by arrow 232. The incoming session initiation message 231 is then processed by the first service module instance 211A. In addition to such session initiation message, other messages that are not session-oriented may also be provided to the service module by the first input buffer 212A. Since these non-session messages are not correlated with any other message as part of a session, the non-session messages may be handled by any of the instances of the service module.

As a result of this processing, it is determined that a session is to be initiated (act 302), and a second input buffer (also referred to herein as a "session-oriented input buffer" or "session input buffer") is associated with the first instance of the service module (act 303). The second input buffer 212B will be used for receiving any subsequent messages for the session. The first service module instance 211A may, for example, notify the associated requesting module 220 that provided the session initiation message of the address of the second input buffer 212B (as represented by arrow 233), so that the requesting module may send subsequent session messages (represented by arrow 234 and ellipses 234A) to the second input buffer 212B.

The first input buffer 212A may not be accessed by a given service module instance once that service module instance is determined to be recycled. In one embodiment, the input buffer 212A is a queue such as an HTTP.sys message queue that is opened by IIS, in which case no more messages may be provided to a given service module instance once the service module instance is determined to be recycled. In contrast, the first service module instance 211A may continue to receive messages from the second input buffer 212B, regardless of whether or not a recycling determination is made for the service module instance 211A.

One or more messages for the session are then received by the second input buffer 212B (act 304) (see arrow 234 and ellipses 234A). This act 304 is illustrated in FIG. 3 as including an asterisk to emphasize that this act is performed (i.e., session messages are received by the second input buffer) regardless of whether or not a recycling determination has been made in the middle of the session. Such incoming session messages would be accessed and processed by the first service module instance 211A (act 305) (see arrow 235 and ellipses 235A) in order to modify session state 214A as appropriate to maintain session continuity. The act 305 is also shown with an asterisk to emphasize that the first service module instance 211A continues processing of the session messages from the session-oriented input buffer 212B, regardless of any recycling determination made mid-session.

Since the session state is managed by a single instance of the service module throughout the lifecycle of the session, the principles of the present invention promote seamless completion of sessions even if a recycling of the service module instance servicing the session is determined mid-session, and even if session state is maintained in volatile memory.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a distributed computing environment that includes a computing system configured to access messages directed towards a service module using a first input buffer, wherein the first input buffer is not accessed by an instance of the service module if the service module instance is determined to be recycled, and the first input buffer comprising one or more computer-readable storage media, a method for preserving correlation between messages of the same session handled by the service module instance, the method comprising:

the first input buffer receiving and storing a session initiation message;

providing the session initiation message to the service module instance;

the service module instance accessing the session initiation message from the first input buffer;

after the service module instance accessing the session initiation message, the service module instance processing the session initiation message;

as a result of processing the session initiation message, determining from the session initiation message that a session is to be initiated;

in response to determining that the session is to be initiated, associating a second input buffer with the service module instance, the second input buffer to be used for receiving any subsequent messages associated with the session, and the second input buffer to be used for the service module instance receiving messages associated with the session regardless of whether or not a recycling determination is made for the service module instance;

receiving one or more subsequent messages of the session in the second input buffer; and the service module instance processing the one or more subsequent messages of the session from the second input buffer.

2. A method in accordance with claim 1, wherein the service module is a process.

3. A method in accordance with claim 1, wherein the service module is an application domain.

4. A method in accordance with claim 1, wherein the first and second input buffers are each queues.

5. A method in accordance with claim 4, wherein the queues are HTTP.sys queues.

6. A method in accordance with claim 1, further comprising the following in response to determining that the session is to be initiated:

notifying a sender of the session initiation message of the address of the second input buffer.

7. A method in accordance with claim 1, wherein the first input buffer also contains non-session messages that are not session initiation messages.

8. A method in accordance with claim 7, wherein the non-session messages may be provided from the first input queue to any one of a plurality of instances of the service module.

9. A computer program product for use in a distributed computing environment that includes a computing system configured to access messages directed towards a service module using a first input buffer, wherein the first input buffer is not accessed by an instance of the service module if the service module instance is determined to be recycled, the computer program product comprising one or more computer-readable storage media having encoded thereon computer-executable instructions that, when executed by one or more processors of the computing system, cause the computing system to perform a method for preserving correlation between messages of the same session handled by the service module instance, the method comprising the method of claim 1.

10. A computer program product in accordance with claim 9, wherein the service module is a process.

11. A computer program product in accordance with claim 9, wherein the service module is an application domain.

12. A computer program product in accordance with claim 9, wherein the first and second input buffers are each queues.

13. A computer program product in accordance with claim 12, wherein the queues are HTTP.sys queues.

14. A computer program product in accordance with claim 9, further comprising the following in response to determining that the session is to be initiated:
   notifying a sender of the session initiation message of the address of the second input buffer.

15. A computer program product in accordance with claim 9, wherein the first input buffer also contains non-session messages that are not session initiation messages.

16. A computer program product in accordance with claim 15, wherein the non-session messages may be provided from the first input queue to any one of a plurality of instances of the service module.

* * * * *